(12) United States Patent
de Lanauze

(10) Patent No.: US 6,341,171 B1
(45) Date of Patent: Jan. 22, 2002

(54) METHOD AND APPARATUS FOR SCANNING AND STORING A LOW RESOLUTION OPTICAL REPRESENTATION OF A FINGER'S IMAGE

(76) Inventor: Pierre de Lanauze, 1231 rue Théorêt, Ile Bizard, Quebec (CA), H9E 1H7

( * ) Notice: Subject to any disclaimer, the term of this patent is extended or adjusted under 35 U.S.C. 154(b) by 0 days.

(21) Appl. No.: 08/370,979

(22) Filed: Jan. 10, 1995

(51) Int. Cl.$^7$ .................................................. G06K 9/00
(52) U.S. Cl. ...................................................... 382/124
(58) Field of Search ................................. 382/124, 126, 382/125, 260, 275, 266, 237; 356/71

(56) References Cited

U.S. PATENT DOCUMENTS

| | | | | |
|---|---|---|---|---|
| 4,015,240 A | * | 3/1977 | Swonger et al. | 382/125 |
| 4,246,568 A | * | 1/1981 | Peterson | 382/126 |
| 4,582,985 A | * | 4/1986 | Löfberg | 382/124 |
| 4,699,149 A | * | 10/1987 | Rice | 382/115 |
| 4,785,171 A | * | 11/1988 | Dowling, Jr. et al. | 382/124 |
| 5,210,797 A | * | 5/1993 | Usui et al. | 382/126 |
| 5,467,403 A | * | 11/1995 | Fishbine et al. | 382/127 |
| 5,532,467 A | * | 7/1996 | Roustaei | 235/472 |
| 5,572,597 A | * | 11/1996 | Chang et al. | 382/125 |

FOREIGN PATENT DOCUMENTS

| | | | | |
|---|---|---|---|---|
| EP | 0251504 | 1/1988 | | G07C/9/00 |
| EP | 0640933 | 3/1995 | | G06K/9/20 |

OTHER PUBLICATIONS

IEEE Proceedings—1990 Southeastcon, vol. 1 of 3, Technologies Today and Tomorrow "Moving–Window Algorithm For Fast Fingerprint Verification" by Hironori, et al., Apr. 1990, pp. 343–347.

IEEE Proceedings—1991 Custom Integrated Circuits Conference, "A Single Chip Sensor & Image Processor For Fingerprint Verification" by Anderson, et al., May 1991, pp. 12.1.1–12.1.4.

* cited by examiner

Primary Examiner—Andrew W. Johns
(74) Attorney, Agent, or Firm—Cobrin & Gittes

(57) ABSTRACT

A method and apparatus for scanning and storing an optical representation of a finger's papillary lines reduces the amount of information for storing in memory by eliminating gray scale regions of the image. An image of the finger's papillary lines is created by a scanning device. The image is then converted to an electrical signal and filtered to reduce the image's resolution. The resulting pattern is then converted to n bytes of digital information. A processor then selects y byte sequences, each byte sequence having m bytes, wherein the product of m and y is less than n. The selected byte sequences are stored such that when the byte sequences are detected out of the n bytes, the identity of the individual is confirmed.

22 Claims, 2 Drawing Sheets

METHOD AND APPARATUS FOR SCANNING AND STORING A LOW RESOLUTION OPTICAL REPRESENTATION OF A FINGER'S IMAGE

FIELD OF THE INVENTION

This invention relates to a method and apparatus for identification of individuals, but more particularly to a method and apparatus for confirming the identity of an individual by the scanning of the fingerprint of the individual's finger.

BACKGROUND OF THE INVENTION

The use of an electronic representation of fingerprints for identification purposes has increased substantially in the last few years. This increase is due mainly to the improvements and miniaturizations made in the field of optics and electronics.

Fingerprints are, for example, used in high security establishments for providing or denying access to secured areas. For example, access to certain rooms or areas requiring high levels of security, may require fingerprint identification. Also, with the recent increase in credit card fraud, some credit card suppliers have experimented with intelligent credit cards, wherein fingerprints are used to authenticate the user of the card. An optical fingerprint reader is used during the credit card scanning process to determine whether the individual using the card is the authorized user of the card.

The need for fingerprint identification and authentication has required increasingly accurate fingerprint scanning devices. In some instances, ultrasonic wave and laser scanning techniques have been used to create holographic or 3-dimensional representations of the fingerprint. Some scanners also make use of special concave scanning surfaces and other scanning techniques to better recreate the scanned image of the fingerprint.

A problem associated with obtaining an accurate representation of a fingerprint is the amount of memory required to store the optical data obtained in the scanning process. Even though that information can generally be stored on a card, the amount of memory required to store sample fingerprints of each user of a banking machine of, say, only one banking institution, would simply be too large to store at each banking machine. For example, if a good monochromatic image is described by 1000×1000 pixels and if each pixel is quantized to 256 levels of gray, then 8 million bits will be required to store or transmit such an image. It would take 8 bits per pixel to code the gray-level values of the image.

Another problem associated with the use or storage of fingerprints is with regards to maintaining confidentiality of the stored information. The extreme accuracy provided by some of these scanners has even been criticized. In some cases, objections on privacy grounds have been raised. For example, there is a perception that the use of the data containing an exact replicate of ones fingerprint might be improperly used by a third party.

This concern or fear amongst user groups has of course limited or delayed the introduction of fingerprint scanners or authentication devices for general public use.

Accordingly, there exist a need for an authentication device which can make use of the uniqueness provided by a fingerprint, but wherein the information necessary to authenticate the fingerprint is insufficient to reconstruct or duplicate the entire fingerprint.

SUMMARY OF INVENTION

It is therefore an object of the present invention to provide an authentication device which can confirm the identity of an individual by using a limited amount of information contained in a fingerprint.

Another object of the present invention is to provide an authentication device in which the information necessary to authenticate the fingerprint is insufficient to reconstruct or duplicate the entire fingerprint.

Another object of the present invention is to minimize the storage required to memorize the information obtained from the scanning of the fingerprint.

According to a first aspect of the invention, there is provided an apparatus for confirming the identity of an individual by the automatic scanning of a fingerprint. It is comprised of a scanning device for scanning the finger print of the individual's finger so as to create an optical pattern of the finger print of said finger. A conversion circuit is used for converting the optical pattern to an electrical signal and an A/D converter is used for converting the analog electrical signal to digital information. The digital information is comprised of n bytes of digital information. A processor is used for receiving the n bytes of digital information and for selecting a number y of byte sequences, each byte sequence having m bytes, wherein the product of m×y<n. A memory stores the selected byte sequences, such that when the correct byte sequence is detected out of said y byte sequences, authenticity of said individual is determined.

According to another aspect of the invention, there is provided a method confirming the identity of an individual, by scanning the fingerprint of the individual. As a first step, a scanning surface, adapted to receive the finger of said individual, is scanned in order to form an optical pattern representative of the contact area between the finger print of said finger and said scanning surface. Then, the optical pattern is converted to an electrical signal and the electrical signal is converted to n bytes of digital information. Once the n-bytes of digital information are received at a processor, a number y of byte sequences are selected. Each byte sequence has m bytes, wherein the product of m×y<n. A memory containing byte sequences representative of fingerprints of a number of individuals requiring authentication is accessed and a comparison is done to determine whether the byte sequences selected by the processor and the byte sequences stored in the memory are the same, such that authenticity of said individual can be determined.

BRIEF DESCRIPTION OF DRAWINGS

FIG. 1b is a side view illustrating the layout of components which can be used to construct the fingerprint scanning apparatus of FIG. 1a;

FIG. 2b is a representation of a byte sequence selected in the process described in FIG. 2a.

DESCRIPTION OF THE PREFERRED EMBODIMENT

Figure 1A:
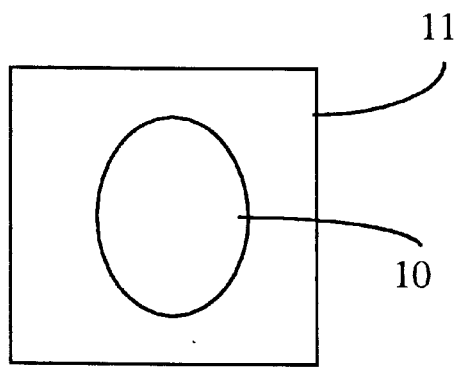
FIG. 1a is a top view of a fingerprint scanning apparatus according to an aspect of the invention.
Figure 1B:
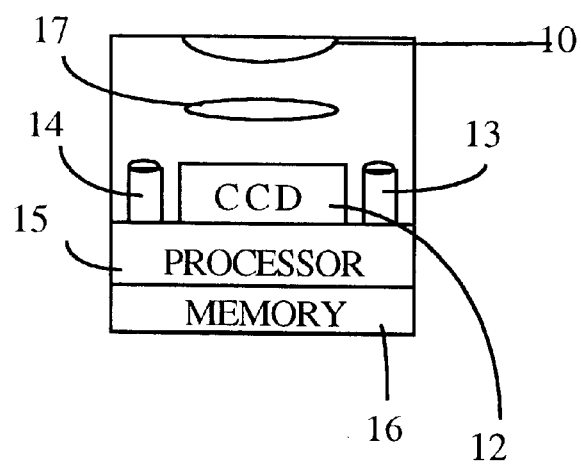

Referring now to FIG. 1a, we have shown a top view of a fingerprint scanning apparatus which can be used as an embodiment of the present invention. A scanning area depicted by reference numeral 10 is disposed on scanning block 11 which contains the required circuitry to confirm the identity of a user. In FIG. 1b is a side, open view of the scanning apparatus, illustrating a general layout of components which can be used for the scanning and authentication process. The scanning area is shown at 10, can either be open directly above the scanning device or include a scanning surface, comprised of a concave surface in the form of a glass plate with a finger size indentation or recess. When a scanning surface is used, a finger 'print' pattern is created by the contact of the finger's papillary lines against the scanning surface. This pattern is scanned to create an optical pattern. When a scanning surface is not used, the scanning device creates an optical pattern which is a representation of the light and dark areas created by the papillary lines of the finger. It will be known to those knowledgeable in the art, that the scanning surface 10 of FIGS. 1a and 1b is for illustration purposes only. The actual surface used will depend on the application.

The scanning block 11 comprises an optical scanning device in the form of a Charged Coupled Device (CCD) 12. Again, it will be understood by those knowledgeable in the art, that other types of image detectors or photo detectors can of course be used. In order to provide sufficient light on the scanning surface, light emitting diodes 13 and 14 can be used. The diodes can emit visible light or light in the infrared end of the spectrum. The advantage of using infrared LEDs, is that no additional light source is required to illuminate the fingerprint. When infrared illumination is used, the CCD 12 is tuned to operate in the infrared end of the light spectrum. The end result is, of course, to provide a scanning device capable of determining the pattern provided by the capillary lines of the finger.

Other types of scanning devices can also be used. For example, an ultrasonic wave emitter, such as described in U.S. Pat. No. 4,977,601 can provide an enhanced image of the fingerprint.

Once an image or optical pattern representing the fingerprint of the user's finger is obtained, CCD 12 converts the scanned pattern to an electrical signal for further processing by processor 15 and storage at memory 16, as will be described in further detail, below. A lens 17 may be used to focus the fingerprint image on the CCD surface.

Figure 2A:
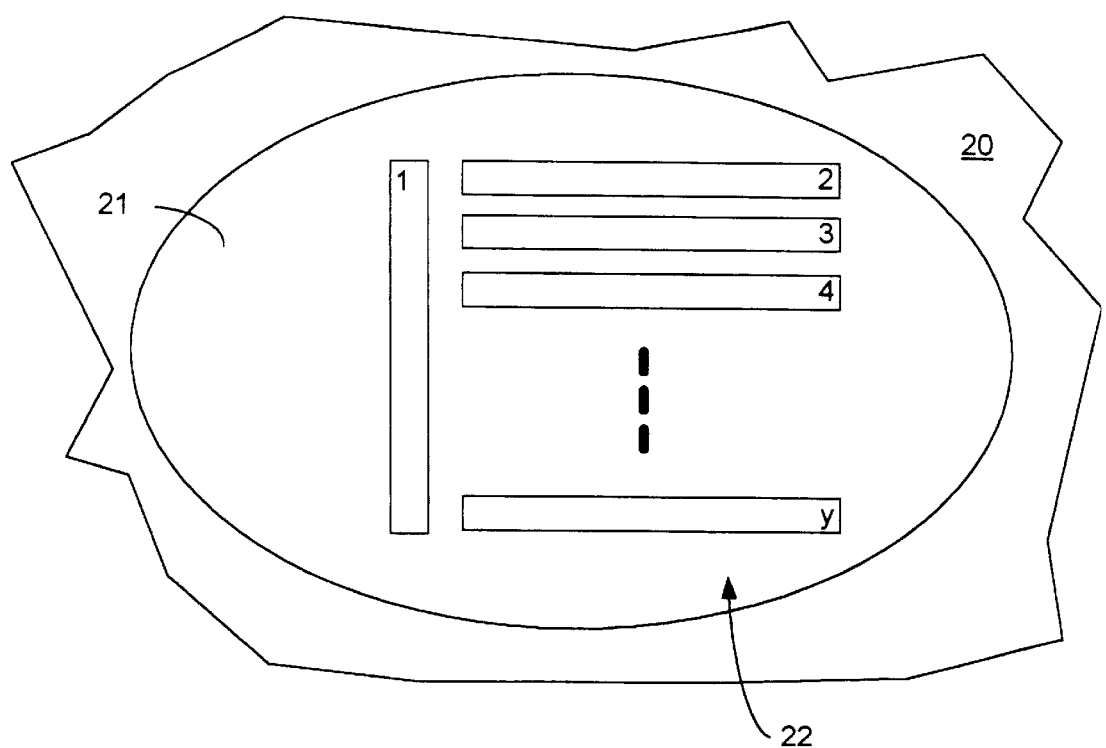
FIG. 2a illustrates the data selection process of the scanned optical pattern according to one embodiment of the invention.

Referring now to FIG. 2a, there is shown an illustration which can be used to describe the scanning and processing steps used to confirm the identity of an individual. In FIG. 2a, reference numeral 20 represents a portion of the scanning surface shown at numeral 10 of FIG. 1a. Numeral 21 represents the contact area obtained when a finger is placed on the scanning surface 20. The shaded area thus is a representation of the fingerprint.

With the scanning apparatus of the present invention, the scanning of the fingerprint is completed as described above. That is, the fingerprint is illuminated and an optical pattern detected. However, in the present invention, the resulting image of the fingerprint is processed to eliminate gray areas leaving a high contrast black and white representation of the fingerprint. The fingerprint representation has a lower resolution and thus contains less information to memorize. Also, even though the entire fingerprint pattern 21 is scanned, only a selected portion or portions 22 of the fingerprint pattern is used in the authentication process. Although the size of the selected portions can vary, it was determined that for a fingerprint representation of lower resolution which is made up of 1 kbyte of data, 100 bytes would be sufficient to identify one individual from millions of other users.

Figure 2B:
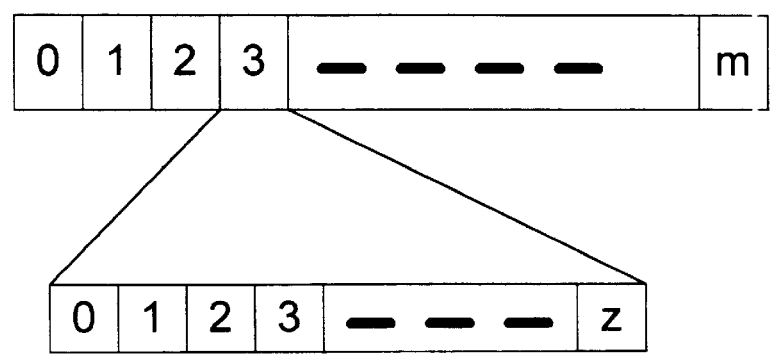

The selected portion 22 is a byte sequence selected according to a predetermined pattern. The byte sequence format is shown in FIG. 2b. It is comprised of m bytes, each byte containing z bits of information. Although a byte normally has 8 bits of information, it can consist of any arbitrary number of bits.

The number of byte sequences y is selected such that the total number of bytes selected, i.e. y×m is less than the total number of bytes n required to reproduce the fingerprint pattern 21. Thus, mathematically, the total number of bytes selected by the processor can be represented by:

$$y \times m < n \qquad \text{i)}$$

wherein y is the number of byte sequences;

m is the number of byte per sequence; and n is the total number of bytes required to reproduce the fingerprint pattern.

Figure 3:
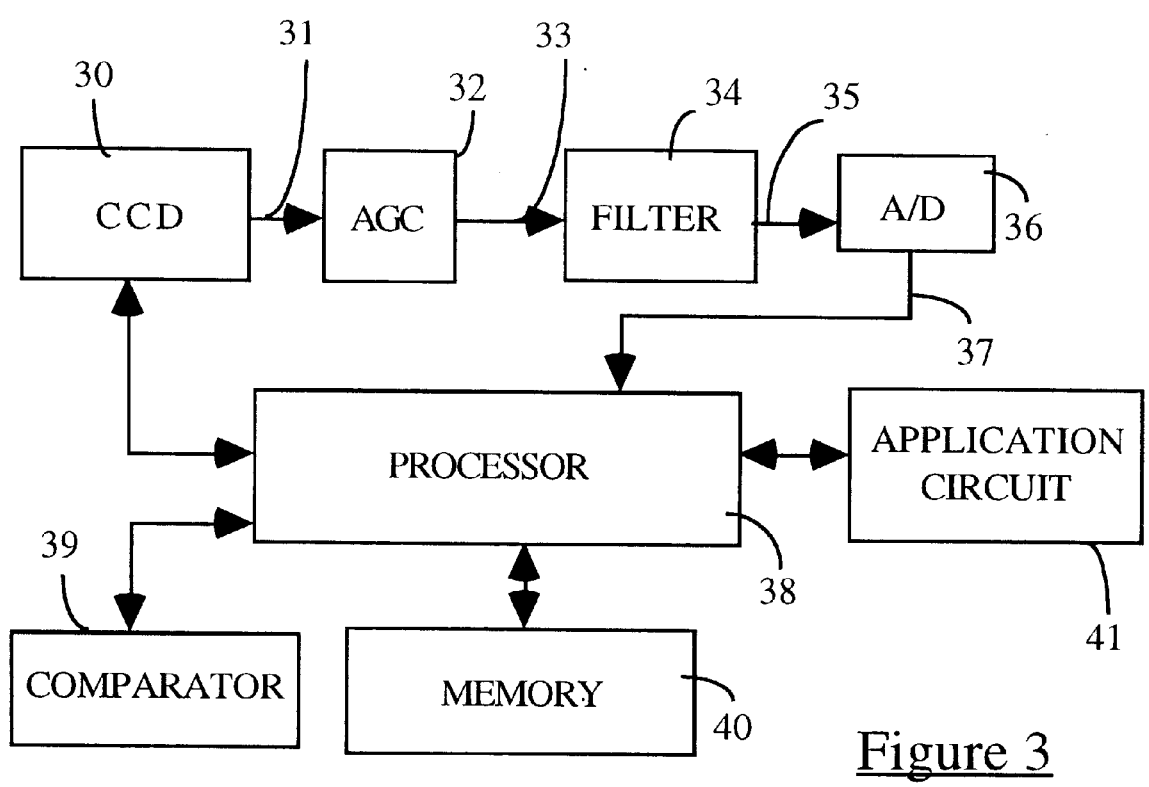
FIG. 3 is a block diagram of the scanning apparatus shown in FIG. 1b, according to an embodiment of the invention.

We will now describe the operation of the invention in accordance with the block diagram of FIG. 3. When confirmation of a user's identification is required, the user's fingerprint is first scanned by the CCD 30. An analog electrical representation of the fingerprint is obtained at output 31. This signal is of varying frequency and amplitude.

In order to eliminate the gray scale regions contained in the signal, the analog signal is passed through an automatic gain control circuit 32 and a noise filter 34. The output signal 33 is a signal of constant amplitude. The output signal 33 is then filtered by noise filter 34. The filter's parameters are set according to the specific application and carrier frequency used. In general, any unwanted gray scale regions or noise is filtered before the signal is converted in digital form. This way, the gray areas or gray scale regions are filtered from the image to reduce the image's resolution.

In optics, the term resolution is a measure of the ability to delineate picture detail. In a monochromatic image of a face, the use of gray scale regions improve the resolution or quality of the picture. Facial features are easier to detect in a gray scale picture. The presence of these gray regions in the fingerprint pattern would therefore substantially increase the number of bytes required to authenticate the user's fingerprint.

The principles behind the use of contrast and gray scales are well know to those knowledgeable in the art of video imaging and need not be described further.

The signal 35 at the output of the filter is a high contrast black and white or monochromatic image of the fingerprint.

The output 35 of the filter 34 is then digitized by an analog to digital conversion circuit 36. The resulting signal 37 is a low resolution, digital representation of the scanned fingerprint.

The processor 38 is used to select, as explained above, a number of byte sequences from the digitized information. The selection of byte sequences can be set at the factory or determined by the service provider. For example, one banking institution could make use of a specific sequence pattern, such as shown in FIG. 2a, for all its customers using automatic teller machines. On the other hand, employees of the banking institution may have a different sequence pattern. Since only a small number of byte sequences, say, 10 is used for identification, it is possible to store the byte sequences of all customers at each automatic teller locations owned by that banking institution, even though thousands of customers may be using this banking service. For example, a 500 megabyte hard disk could contain byte sequences of 5 million users. Therefore, a banking or access card combined with Personal Identification Numbers would not be required for accessing one's personal account.

Thus, when a customer wants to make use of the institution's automatic teller machine, anywhere in the country, authentication could be done on site, using the customer's pre memorized byte sequence.

The comparator circuit 39 would in this case be used in conjunction with the memory or storage device 40 to confirm the identity of the user. Thus, if the byte sequence stored in memory 40 contains a high percentage of the bytes scanned by the fingerprint scanning device, the identity of the user is confirmed. The level of accuracy or percentage of bytes identified can be selected according to the application.

The application circuit 41 can be any of a number of trigger devices used for accessing a specific product or service. For example, other than automatic teller machines, the application circuit could be a lock arrangement for providing access to a vehicle, secure building or other area requiring the use of a sophisticated lock mechanism.

It will of course be obvious to those knowledgeable in this art that other applications wherein user identification is required can make use of this authentication apparatus and method.

The skilled person will recognize that the invention is in no way limited to the exemplifying embodiment described by way of illustration. Any variant or modification, or any equivalent arrangement, must be regarded as lying within the scope of the invention, as defined by the following claims.

I claim:

1. An apparatus for creating an image to uniquely identify an individual, said apparatus comprising:
    a scanner arranged to scan a fingerprint side of the individual's finger to provide an image of the finger's papillary lines, said image including a plurality of gray scale regions;
    a converter arranged to convert said image to an electrical signal representative of said image;
    a filter arranged to filter said electrical signal so that electrical representations of the gray scale regions are filtered out of the electrical signal;
    an analog-to-digital (A/D) converter arranged to convert said filtered electrical signal to digital information; and
    a processor arranged to select portions of the digital information such that an entirety of the image fails to be reproducible from the selected portions.

2. An apparatus as claimed in claim 1, further comprising a digital storage arranged to store the selected portions of said digital information for retrieval.

3. An apparatus as claimed in claim 2, further comprising a comparator circuit arranged to compare the digital information stored in said digital storage to authenticate an identity of an individual whose fingerprint side of the finger was scanned.

4. An apparatus as claimed in claim 1, wherein said scanner comprises a charged couple device.

5. An apparatus as claimed in claim 4, wherein said charged couple device is arranged to operate in an infrared region.

6. An apparatus as claimed in claim 1, wherein said scanner further comprises a scanning surface arranged to receive said fingerprint side of the finger to enable the formation of said image.

7. An apparatus as claimed in claim 6, further comprising light emitting diodes (LEDs) arranged to illuminate the scanning surface such that the papillary lines of said finger become illuminated.

8. An apparatus as claimed in claim 7 wherein said LEDs are arranged to operate in an infrared spectrum.

9. An apparatus as claimed in claim 1 wherein said filtering circuit comprises a noise filter arranged to reduce a resolution of the image.

10. An apparatus as claimed in claim 1, wherein the processor is arranged to receive n bytes of digital information from said analog-to-digital converter and is arranged to select a number y of byte sequences, each byte sequence having m bytes, wherein the product of m and y is less than n.

11. An apparatus as claimed in claim 10, wherein said processor is arranged to select a number of the byte sequences that are sufficient to uniquely identify the individual whose fingerprint side of the finger was scanned and yet insufficient to reproduce an entirety of the filtered image of the fingerprint side of the finger.

12. An apparatus as claimed in claim 1 wherein said filter comprises an automatic gain control and a filtering circuit.

13. A method of obtaining a digital representation of a selected region of a finger's papillary lines, comprising the steps of:
    scanning the fingerprint side of a finger to provide an image of the finger's papillary lines, the image including a plurality of gray scale regions in the image;
    converting said image to an electrical signal representative of said image;
    filtering said electrical signal such that the gray scale regions of the image are removed from the electrical signal;
    converting said filtered electrical signal to digital information; and
    selecting portions of said digital information such that an entirety of the image is free from being reproducible from the selected portions.

14. A method as claimed in claim 13, further comprising a step of storing the selected portions of said digital information for retrieval.

15. A method as claimed in claim 13, wherein said step of scanning is carried out by scanning with infrared light.

16. A method as claimed in claim 13, wherein said step of converting includes converting said image to said electrical signal using a charged couple device.

17. A method as claimed in claim 16, further comprising illuminating said finger using light emitting diodes (LEDs).

18. A method as claimed in claim 17, further comprising operating said LEDs in the infrared spectrum.

19. A method as claimed in claim 13, further comprising the steps of comparing the digital information with stored selected portions of said digital information to determine the identity of an individual whose finger was scanned.

20. A method as claimed in claim 13, further comprising the steps of receiving n bytes of said digital information at a processor, the step of selecting including selecting a number of y byte sequences from said digital information, each byte sequence having m bytes, wherein the product of m and y is less than n.

21. A method as claimed in claim 20, wherein the step of selecting yields a number of the byte sequences sufficient to determine the identity of the individual whose finger was scanned but insufficient to reproduce an entirety of the filtered image of the finger's papillary lines.

22. A method as claimed in claim 13 wherein said step of filtering further comprises changing the gain of said electrical signal and filtering noise therefrom.

* * * * *